Nov. 27, 1945.  C. W. J. WENDE  2,389,655
POLYAMIDE ARTICLE
Filed Oct. 13, 1941
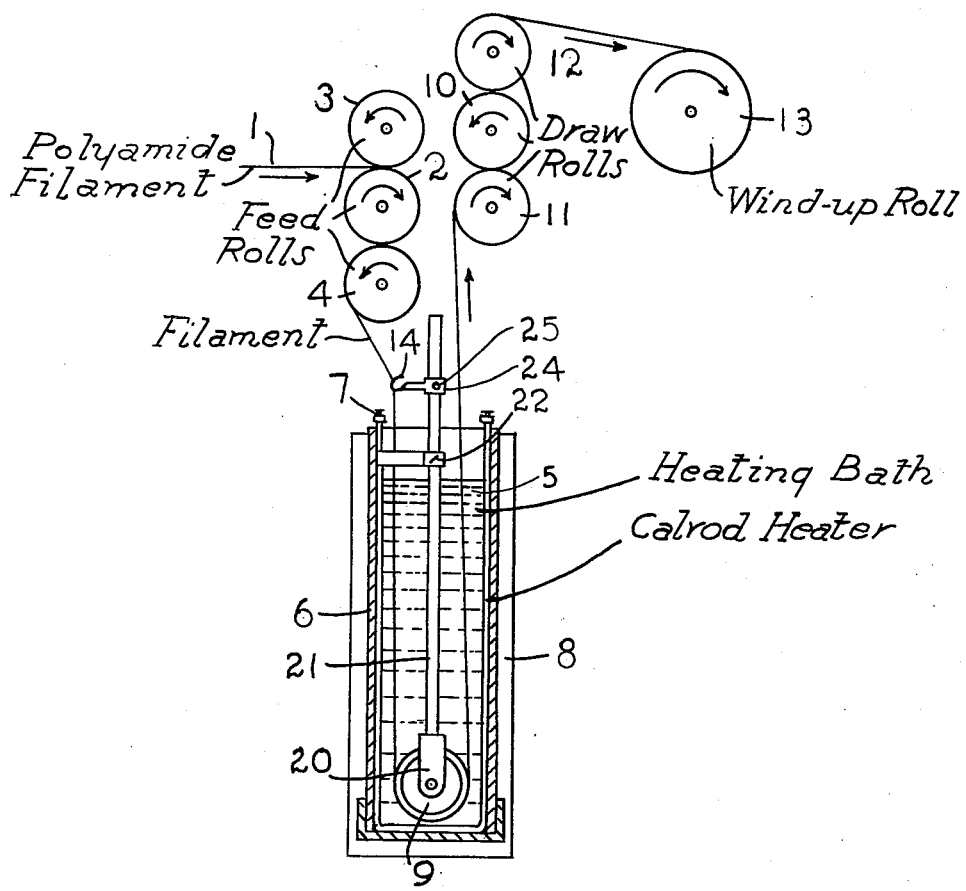
Inventor
Charles W. J. Wende
By R. F. Miller
Attorney Patented Nov. 27, 1945

2,389,655

UNITED STATES PATENT OFFICE 2,389,655

POLYAMIDE ARTICLES

Charles W. J. Wende, Arden, Del., assignor to E. I. du Pont de Nemours & Company, Wilmington, Del., a corporation of Delaware Application October 13, 1941, Serial No. 414,846

10 Claims. (Cl. 18—54)

This invention relates to the manufacture of filaments, films and other articles from synthetic polymeric materials, and more particularly to the manufacture of improved products from the high molecular weight or fiber-forming polyamides.

The synthetic polymeric materials used in the practice of this invention are synthetic linear polyamides of the general type described in U. S. Patents 2,071,250, 2,071,253 and 2,130,948. The polymers there described are high molecular weight products which are generally obtainable crystalline in structure as evidenced by X-ray powder diffraction patterns of the polymers in the massive state. The high molecular weight required for the best fiber-forming properties is obtained by continuing the polymerization until the intrinsic viscosity, defined as given in the last mentioned patent, is at least 0.4. The polyamides of the present type, generally speaking, comprise the reaction product of a linear polymer-forming composition, for example, a composition consisting of bifunctional reacting material, which comprises in substantial amount molecules containing two amide-forming groups, each of which is complementary to an amide-forming group in other molecules in said composition.

These polyamides as described above or as otherwise identified hereinafter can be obtained, for example, by self-polymerization of a monoaminomonocarboxylic acid, or by reacting a diamine with a dibasic carboxylic acid in substantially equimolecular amounts, it being understood that reference herein to the amino acids, diamines and dibasic carboxylic acids is intended to include the equivalent amide-forming derivatives of these reactants.

These linear polyamides include also polymers obtained by admixture of other linear polymer-forming reactants, as for instance glycol-dibasic acid mixtures in the case of polyester-amides, with the mentioned polyamide-forming reactants. In both the simple and modified linear polyamides the amide group,

in which X is oxygen or sulfur, is an integral part of the main chain of atoms in the polymer and the average number of carbon atoms separating the amide groups is at least two. On hydrolysis with hydrochloric acid the amino acid polymers yield the amino acid hydrochloride, and the diamine-dibasic acid polymers yield the diamine hydrochloride and the dibasic carboxylic acid.

A characteristic property of the above described polymers is their capability of high and permanent linear extension under stress (as for example by cold rolling or cold drawing) in the solid state with resulting high molecular orientation in the direction of the stress. Thus filaments extruded or otherwise obtained from the polyamides can be drawn into fibers which show by characteristic X-ray patterns molecular orientation along the fiber axis. In the previous practice the filaments were drawn at room temperature or at temperatures up to 100° C. Although drawing can thus be effected, good results in the case of small filaments require that the filaments first be conditioned in an atmosphere of 70% or more relative humidity, and in the case of large filament that the filaments be soaked in water or be subjected to steam treatment. Careful drawing (often impractical) is required when the moisture content of the filaments is below that attained in equilibrium with an atmosphere having a relative humidity of about 50% in order to obtain uniform drawing and to avoid breakage. With substantially lower moisture content the polyamide cannot be drawn successfully at these temperatures.

Filaments of polyhexamethylene adipamide conditioned at 70% relative humidity can be drawn from 350 to 500% at room temperature, or at temperatures of about 100° C. in water or steam. The filaments can also be drawn at more elevated temperatures but the degree of drawing is not substantially greater than can be obtained at room temperature. The oriented products thus obtained have a tensile strength of 3 to 5.5 grams per denier and a modulus of elasticity of about 0.45 x 10⁶ pounds per square inch at 50% relative humidity.

This invention has as an object the manufacture of improved polyamide products. A further object is a process for obtaining synthetic linear polyamide filaments, yarns, bristles, ribbons, films, etc. having a tensile strength and modulus of elasticity higher, and a thermo-extensibility factor lower, than that previously obtained. Other objects will appear hereinafter.

These objects are accomplished in the manner more fully pointed out hereinafter by a process which comprises heating polyamide articles of the kind mentioned above while under tension and while in the dry state defined below, to a temperature above 120° C. but at least about 30° C. below the melting point of the polyamide as determined in an inert atmosphere. In most instances the temperature selected will be from 30 to 150° C. below the melting point of the polymer. The tension used is sufficient to prevent shrinkage of the article and is preferably great enough to elongate the article.

The process of this invention, in which the dry polyamide article is heated under tension, can be used to increase the degree of orientation and to improve the properties of polyamide articles which have been oriented by the known methods. The invention, however, is usually applied to polyamide products which have not previously been oriented by drawing or rolling.

I have discovered when the drawing of the dry filaments or films is carried out under the conditions mentioned above that the polyamide not only can be drawn readily to greater elongation (from 400 to 750%) than that which could be obtained easily heretofore, but also that the resulting more highly oriented product can have as much as twice the tensile strength, twice the modulus of elasticity, and one-third the thermoextensibility factor of filaments and films drawn in the conventional manner. The tension under which the dry hot drawing of the polyamide takes place is usually of the order of from about 0.3 to 1.5 grams per denier. When the process is applied to articles such as filaments, films and the like which have not previously received an orienting treatment, the tension applied is sufficient to draw the article to an increase in length of at least 400%.

The drawing of the polyamide under the higher temperatures used in the practice of this invention must take place when the polyamide is essentially dry, namely, when the polyamide has been dried to the extent that its moisture content is below that present through equilibrium with an atmosphere of 15% relative humidity, and preferably below that present through equilibrium with an atmosphere of 5% relative humidity. The permissible moisture content based on the weight of the polyamide is below 0.7% and for the best results is below 0.6%. It is to be observed that the use of both essentially dry polyamide and high temperature are necessary, and that neither of these requirements alone is sufficient to give the desired result. If the lower temperatures previously applied to moisture containing filaments are used with dry filaments, the filaments tend to break when an attempt is made to draw them. On the other hand, the present higher temperatures cannot be used to secure a high degree of drawing with moisture-containing polyamide because the tension required to secure elongations comparable with those possible with dry filaments causes the filaments to break.

In the case of polyhexamethylene sebacamide (melting point 220° C.) for example, the highest draw previously obtainable, about 500% with a tensile strength of about 4.9 grams per denier, results from drawing the filament in steam at 100° C. Under the present practice of using the dry polyamide and higher temperatures the maximum draw at 130° C. is 550% and the tensile strength is 6.0 grams per denier. These values increase with rising temperature until at 175° C. the maximum draw is 725% and the tensile strength is 9.1 grams per denier. From this optimum the values decrease with further rise in temperature until the operable limit, which is in the neighborhood of about 190° C. where the maximum draw is 600% and the tensile strength is 8 grams per denier. In the case of polyhexamethylene adipamide (melting point 264° C.) the maximum draw in steam is 500% and the resulting tenacity is 4.3 grams per denier. The maximum draw and tenacity for the filament dry drawn at 160° C. are 500% and 8.0 grams per denier respectively. The optimum values of 620% draw and 8.2 grams per denier tenacity are found from 180° to 190° C. These values decrease slightly at first and then more rapidly as the temperature reaches 235° C. where the maximum draw is 400% and the tenacity is 4.0 grams per denier.

In the drawing the single figure shows schematically in elevation suitable apparatus for carrying out the invention as applied to filaments.

The undrawn filament 1 after extrusion from the molten polymer, quenching in a water bath, not shown, and drying, is led to a series of pinch or feed rolls consisting of a brass roll 2 and two rubber rolls 3 and 4. The filament is fed from these rolls over the guide hook 14 into a heated bath 5 of Wood's metal contained in the vessel 6 heated by Calrod heaters 7 adapted to heat the bath to a temperature from about 30° to 150° C. below the melting point of the polymer comprising the filament. The vessel 6 containing the bath is provided wtih a jacket 8 of asbestos or other insulating material. The travel of the filament is reversed at the bottom of the bath by passing under the guide wheel 9 to a series of draw or pinch rolls consisting of a brass roll 10 and two rubber rolls 11 and 12. The draw rolls operate at a speed of from 4 to 7.5 times the speed of the feed rolls which draws the filament in the bath this amount over the original length. The drawn filament is then led to a wind-up roll 13.

The filament is maintained under the desired constant drawing tension by the speed differential of the feed and draw rolls. The guide wheel 9 is pivoted in the yoke 20 carried at the end of rod 21 longitudinally adjustable in the clamp 22 which is rigidly mounted with respect to the feed and draw rolls. The time of contact of the filament with the bath can be shortened by adjusting the rod 21 in the clamp 22 with respect to the containing vessel 6. The tension and draw ratio can be varied by changing the speed differential of the feed and draw rolls. The guide hook 14 is carried by a bracket 24 slidable on the rod 21 and held in place by a set screw 25.

The invention is described in further detail in the following examples.

*Example I*

A filament 0.016" in diameter of polyhexamethylene sebacamide melting at 220° C. and having a melt viscosity of 1300 poises at 285° C. is dried over calcium chloride to a moisture content below 0.7%. The filament is then passed by the means described above into the bath of Wood's metal maintained at 175° C. The tension on the filament is that imparted by operating the drawing pinch rolls at a speed 7.15 times that of the feeder pinch rolls. The time of passage through the bath is about 5 seconds and the diameter of the drawn filament is 0.005".

The tensile strength in terms of grams per denier of the filament drawn 715% in accordance with the above example is 9.1 as compared to a tensile strength of 4.0 for a water soaked filament drawn to its maximum of 465% at room temperature, and to 4.9 for a similar filament drawn to its maximum of 500% in steam at 100° C. The modulus of elasticity is greater than that of filaments drawn from moisture-containing polyamide, being $0.84 \times 10^6$ pounds per square inch at 50% relative humidity and $0.63 \times 10^6$ pounds per square inch at 100% relative humidity as compared to $0.42 \times 10^6$ and $0.29 \times 10^6$ respectively for filaments drawn from moisture-containing polyamide. The filament obtained by the method of the example also absorbs 50% less moisture than the filaments drawn by the methods previously used.

*Example II*

Polyhexamethylene adipamide filament of 61 denier dried to a moisture content of 0.5% is passed through the described apparatus in which the bath of Wood's metal is maintained at 190° C. and the tension is that which is imparted by a speed ratio of 6:1 between the draw and feed rolls, and which, therefore, draws the filament to 600% of its original length. A 10 denier fiber having a tensile strength of 8.2 grams per denier is obtained.

The tenacity of the fiber obtained in accordance with the above example is 91% higher than that of the fiber obtained when a similar polyhexamethylene adipamide filament in equilibrium with atmospheric moisture is drawn 428% at room temperature. The resilience of the hot drawn product is 79.0%, a 36% improvement over the 58% resilience value of this material drawn 428% by the older method. The resilience as defined herein is the percentage of energy recovered from a fiber to which a known amount of energy in the form of a bend has been imparted. The hot drawn product shows a higher degree of orientation as evidenced by its X-ray diffraction pattern. The "thermo-extensibility factor" of the hot drawn fibers is 0.2 which is a three-fold improvement over the value of 0.6 for fibers of this material fully drawn at room temperature. The thermo-extensibility factor is determined by loading a filament (or yarn) with 1 gram per denier, exposing the loaded filament to a temperature of 135° C., and measuring the length of the filament after 30 minutes and again after 1,000 minutes. From the data thus obtained the thermo-extensibility factor is determined with the aid of the following equation:

$$T_x = \frac{\frac{(L_{1000} - L_{30})}{L_0} \times 100}{1.523}$$

wherein $T_x$ = thermo-extensibility factor, $L_{1000}$ = length 1000 minutes after loading, $L_{30}$ = length 30 minutes after loading, and $L_0$ = length at time of loading.

The numerical value of the thermo-extensibility factor for a yarn or cord will depend to a considerable extent on the twist and cord construction. In general, a highly twisted yarn or cord will have a higher thermo-extensibility factor than a similar untwisted yarn or cord. To eliminate the effects of twist, therefore, comparative tests on yarns and cords should be made on untwisted products.

*Example III*

A polyhexamethylene adipamide melt-cast film of 0.005" thickness dried to a moisture content of 0.5% is passed through the apparatus after replacing the grooved guide wheel 9 with a roller. The heat transfer medium in the bath is mineral oil which is maintained at 185° C. and the draw and feed rolls are operated at a 4.8:1 ratio of peripheral speeds, i. e. the material is drawn to 480% of its original length during the heat treatment. The resulting film shows by X-ray diffraction pattern a high degree of molecular orientation and exceptionally high tensile strength.

The film obtained by the above procedure is increased seven-fold in tensile strength over the undrawn film, whereas film of the same polyamide oriented by rolling or drawing at ordinary temperatures is improved in tensile strength only three to five-fold over the unoriented film. The present method of drawing the film also improves the modulus of elasticity by 70% and decreases the moisture absorption at 100% relative humidity from 7.6% to 4.5%. Being less hygroscopic, the film does not undergo as great dimensional changes with changes in relative humidity as does polyhexamethylene adipamide film which has been oriented to a lesser extent by rolling or drawing in a wet condition at room temperature. This is important in connection with the use of the product as a photographic film base.

*Example IV*

Polyhexamethylene sebacamide is spun into a filament 0.020" in diameter and this filament, after desiccation over calcium chloride, is processed as described in Example I. The bath is filled with Wood's metal maintained at 170° C. and the speed ratio of the draw and feed rolls is 4:1 which is much lower than the maximum possible at this temperature. The monofil is thus drawn to 400% of its original length, its diameter is reduced to 0.010", and it has a tenacity of 3.4 grams per denier with a residual elongation to break of 17%. The knot tenacity of this fiber is 3.0 grams per denier and the break elongation is 14%.

The improvement obtained by the present process in the transverse properties, i. e. the residual elongation at a given tenacity and the tensile strength and elongation of knotted fiber, is shown by comparing the above figures with the results obtained from a fiber drawn 400% at room temperature from the same monofil soaked in water. The tenacity of the wet drawn fiber is 3.5 grams per denier, the break elongation 14%, and the knot tenacity 2.5 grams per denier with an elongation to break of only 8%.

Results similar to those given in the above example are obtained in elongating 143 denier-13 filament polyhexamethylene adipamide yarn to 400% of its original length during heat treatment at 150° C. The tenacity is 5.8 grams per denier with a residual elongation to break of 16%. Drawing to 400% of the original filament length at room temperature produces fibers with a tenacity of 5.2 grams per denier and a residual elongation of only 12%.

Examples of other polyamides and articles therefrom useful in the practice of this invention are those described in the above mentioned patents. Since the present invention involves heating the polyamides to at least 120° C. but below their melting point, it will be apparent that this invention is concerned with polyamides having melting points above 120° C. In the case of the linear amide interpolymers, the ratio of amide linkages to other carbon-non-carbon linkages, as for instance to the ester groups in the polyester-amides, is as a rule above 1:20 in order that the polymer exhibit the polyamide properties desired for the present purpose. The amide-forming derivatives which can be used in place of the dibasic carboxylic acids, diamines, and amino acids include a number of available compounds. Amide-forming derivatives of the amino acids include the ester, anhydride, amide, lactam, acid halide, N-formyl derivatives, carbamate, and nitrile in the presence of water. Amide-forming derivatives of the dibasic carboxylic acids comprise the mono- and di-ester, the anhydride, the mono- and diamide, acid halide, and the following compounds in the presence of water: Nitrile, cyanocarboxylic acid, cyanoamide, and cyclic imide. Amide-forming derivatives of the diamines include the carbamate, N-formyl derivative and the N,N'-diformyl derivative.

The polyamides whether simple polyamides, interpolyamides, or interpolymers derived from polyamide-forming and other polymer-forming compositions can be mixed with other suitable ingredients and modifiers. Examples of resinous materials which are for some purposes used to advantage are phenol-formaldehyde, p-t-butyl-phenol-formaldehyde and o-cyclohexylphenol-formaldehyde resins. Suitable delusterants are materials such as titanium dioxide, zinc oxide, carbon black and barium sulfate. Suitable plasticizers are phenols and sulfonamides.

The polymer can be heated not only by contact with hot, inert liquids such as Wood's metal, kerosene, molten salts, etc. but also by hot inert gases such as nitrogen, hydrogen and carbon dioxide. Contact with hot metal surfaces is another method of transferring heat to the material. Still other methods of bringing the temperature of the polyamide within the required range are to subject it to infra-red radiation or to place it in a high frequency electrical field. These methods are especially effective since they do not involve heat transfer through the surface. If provision is made in the heating device to dry the filament before the drawing tension is applied, it is possible to operate with an initially moist filament.

The filaments and films obtained by the present process have at least 20% greater modulus of elasticity and tensile strength than those drawn by prior methods. In addition, products made by the process of this invention absorb less moisture. Thus, filaments of polyhexamethylene adipamide can be obtained by the present method which absorb less than 4.7% by weight of moisture at a relative humidity of 100%, whereas polyhexamethylene adipamide filaments previously known absorb at least 7.6% of moisture at the mentioned relative humidity. An advantage of the process of this invention, aside from the improved properties of the product, is that it increases the capacity of the spinning units. This is because the high draw ratios attainable make it possible to spin filaments of higher denier than would otherwise be possible in obtaining a drawn filament of a given denier. Another important advantage of the process is that hot drawing is accomplished with fewer filament breaks than drawing at normal or moderately elevated temperatures.

The improved polyamide products obtained by the process of this invention are of increased utility for the purposes mentioned in the patents previously referred to. Products in which the unusually high tensile strength, moisture resistance and stiffness obtainable by the present process are of particular value include parachute cords and fabrics, airplane fabrics, balloon cloth, bristles for general use, fishing leaders, sewing thread, photographic film, shower curtains, umbrellas, wrapping film, moisture-proof containers, etc. Fibers with the low thermo-extensibility factor obtained in the practice of this invention are useful as tire cord. A high thermo-extensibility factor is objectionable in tire cord because it causes the tire carcass, on becoming hot in service, to become larger, sometimes to the extent that the tire does not fit the rim or even to the extent that the tire cannot be used alongside a tire that has not enlarged in the case of trucks having double wheels in the rear.

As many apparently widely different embodiments of this invention may be made without departing from the spirit and scope thereof, it is to be understood that I do not limit myself to the specific embodiments thereof except as defined in the appended claims.

I claim:

1. A process for obtaining synthetic linear polyamide articles of improved properties which comprises drying the polyamide article to a moisture content below 0.7% by weight of the polyamide, and then heating the dried polyamide article above 120° C. but below the melting point of the polyamide while the polyamide is under sufficient tension to prevent retraction.

2. A process for obtaining synthetic linear polyamide articles of improved properties which comprises drying the polyamide article to a moisture content below 0.7% by weight of the polyamide, and then heating the dried polyamide article at a temperature above 120° C. but below the melting point of the polyamide while the polyamide is under a tension which draws the hot dry polyamide to substantial increase in length.

3. A process for orienting a synthetic linear polyamide article of the class consisting of filaments, films and the like, which comprises drying the article to a moisture content below 0.7% by weight of the polyamide, and then heating the dried polyamide article above 120°·C. and from 30° to 150° C. below the melting point of the polyamide while the article is under tension which draws the article to an increase in length of at least 400%.

4. A process for treating a synthetic linear polyamide filament which is capable of being permanently elongated in the solid state, said process comprising drying said filament to a moisture content below 0.7% by weight of the polyamide, and then passing the dried filament into an essentially anhydrous fluid bath heated at a temperature above 120° C. and from 30° to 150° C. below the melting point of the polyamide, and while the filament is passing through the bath applying a tension thereto which draws the hot dry filament to permanent increase in length.

5. A process for treating a synthetic linear polyamide film which is capable of being permanently elongated in the solid state, said process comprising drying said film to a moisture content below 0.7% by weight of the polyamide, and then passing the dried film into an essentially anhydrous fluid bath heated at a temperature above 120° C. and from 30° to 150° C. below the melting point of the polyamide, and while the film is passing through the bath applying a tension thereto which draws the hot dry film to permanent increase in length.

6. A synthetic linear polyamide filament having a tensile strength of more than 8.0 grams per denier and a moisture absorption of less than 4.7% by weight of the polyamide at a relative humidity of 100%, said filament being obtained by drying the polyamide to a moisture content below 0.7% by weight of the polyamide, and then drawing the dried polyamide under tension from an incompletely oriented state to permanent increase in length while in essentially dry condition and at a temperature above 120° C. and from 30° to 150° C. below the melting point of the polyamide.

7. The process set forth in claim 3 in which said polyamide article comprises polyhexamethylene adipamide.

8. The process set forth in claim 3 in which said polyamide article comprises polyhexamethylene sebacamide.

9. The synthetic linear polyamide filament set forth in claim 6 in which the polyamide is polyhexamethylene adipamide.

10. The synthetic linear polyamide filament set forth in claim 6 in which the polyamide is polyhexamethylene sebacamide.

CHARLES W. J. WENDE.